United States Patent [19]

Kim

[11] 4,218,353

[45] Aug. 19, 1980

[54] EXTERNAL LUBRICANT COMPOSITIONS FOR RIGID VINYL POLYMERS

[75] Inventor: Yang K. Kim, Repulse Bay, Hong Kong

[73] Assignee: Allied Chemical Corporation, Morris Township, Morris County, N.J.

[21] Appl. No.: 742,829

[22] Filed: Nov. 18, 1976

[51] Int. Cl.$^2$ .............................................. C08L 91/06
[52] U.S. Cl. ................................ 260/28.5 D; 106/270
[58] Field of Search .................. 260/28.5 D, 33.6 PQ, 260/897 C; 106/270

[56] References Cited

U.S. PATENT DOCUMENTS

| | | | |
|---|---|---|---|
| 3,060,163 | 10/1962 | Erchak | 260/94.9 |
| 3,322,711 | 5/1967 | Bush | 260/29.6 |
| 3,444,155 | 5/1969 | Fish | 260/33.6 PQ |
| 3,640,828 | 2/1972 | Brotz | 252/17 |
| 3,679,619 | 7/1972 | Stapfer | 260/23 XA |
| 3,757,001 | 9/1973 | Reiter | 260/28.5 D |
| 3,772,233 | 11/1973 | Gaab | 106/270 |
| 3,979,347 | 9/1976 | Brotz | 260/28.5 D |

FOREIGN PATENT DOCUMENTS 571090 2/1959 Canada .

*Primary Examiner*—Paul R. Michl
*Attorney, Agent, or Firm*—Patrick L. Henry; Alan M. Doernberg

[57] ABSTRACT

An external lubricant composition for lubricating vinyl polymers comprising a blend of:
  (a) from about 60 to 99 percent by weight of an alpha-olefin having;
    (1) an average molecular weight of from about 350 to 900,
    (2) a minimum congealing point of 120° F. as determined by ASTM D-938,
    (3) a minimum iodine value of 30, and
    (4) a maximum Brookfield viscosity at 257° F. of 100 centipoises; and
  (b) from about 1 to 40 percent by weight of an oxidized low molecular weight polyethylene having an average molecular weight of less than about 5,000. The invention also relates to vinyl polymers, such as polyvinyl chloride, containing such external lubricants.

7 Claims, No Drawings

EXTERNAL LUBRICANT COMPOSITIONS FOR RIGID VINYL POLYMERS

BACKGROUND OF THE INVENTION

1. Field of the Invention

This invention relates to external lubricant compositions for rigid vinyl polymers, and particularly for rigid polyvinyl chloride, and to polymer compositions containing such lubricants.

2. Description of the Prior Art

Rigid vinyl polymer compositions, such as polyvinyl chloride compositions, are utilized for producing a variety of structural articles such as plastic pipe, siding, containers and sheets. These rigid compositions are substantially unplasticized but generally contain a lubricant to facilitate the extrusion or other melt processing of the articles.

Lubricants for vinyl polymers are generally classified as external or internal lubricants. An external lubricant provides a lubricating layer between the plastic melt and the metal surfaces of the processing equipment. The external lubricant serves to coat the individual particles of the resin and inhibits their fusing together into a homogeneous melt. On the other hand, internal lubricants reduce the effective melt viscosity of the polymer at the processing temperatures in order to improve its flow properites during processing as well as promote fusing.

Previously suggested external lubricants for rigid vinyl polymers include paraffin oils and waxes as well as higher fatty acid amides. See, for example, U.S. Pat. No. 3,679,619 to Stapfer et al. (1972). In addition, U.S. Pat. No. 3,640,828 to Brotz et. al. (1972) discloses blends of a metal soap and/or a wax containing a metal soap and a hydrocarbon wax as lubricant for polyvinyl chloride. U.S. Pat. No. 3,979,347 to Brotz et. al. (1976) suggests the use of high molecular weight oxidized polyethylenes as lubricants for polyvinyl chloride. The use of low molecular weight polyethylenes as lubricants for plasticized polyvinyl chloride is suggested in Canadian Pat. No. 571,090 to Schule (1959). In addition, there has been previously utilized as lubricant for rigid polyvinyl chloride a blend of a 165° F. paraffin wax and an oxidized low molecular polyethylene; however, the fusion and stability times for such blends are too short and the fusion torque is too high for some operations and in particular, multiscrew extrusion operations. It would be desirable if there were provided a lubricant composition which provided increased fusion and stability times with decreased torque at fusion.

SUMMARY OF THE INVENTION

In accordance with this invention, there is provided an external lubricant composition for lubricating vinyl polymers comprising a blend of:
(a) from about 60 to 99 percent by weigh of an alpha-olefin having
 (1) an average molecular weight of from about 350 to 900,
 (2) a minimum congealing point of 120° F. as determined by ASTM D-938,
 (3) a minimum iodine value of 30, and
 (4) a maximum Brookfield viscosity at 257° F. (125° C.) of 100 centipoises; and
(b) from about 1 to 40 percent by weight of an oxidized low molecular weight polyethylene having an average molecular weight of less than about 5,000.

Also in accordance with this invention there are provided rigid vinyl polymer compositions, especially rigid polyvinyl chloride compositions, containing the aforesaid lubricant as the external lubricant.

It has been surprisingly found that the lubricants of the present invention provide excellent lubricity to rigid vinyl polymer compositions, especially polyvinyl chloride, and also provide increased fusion and stability times and reduced torque at fusion.

DESCRIPTION OF THE PREFERRED EMBODIMENTS

The alpha-olefins useful in the present invention are low molecular weight olefins produced by polymerizing ethylene using a modified process such that one double bond functional group per molecule is retained in the final product. The products are waxlike solids resembling the paraffin waxes derived from petroleum and are soft and/or friable so that they can be readily flaked or powdered with the fingernail. Such alpha-olefins have a relatively high degree of unsaturation (iodine value of a minimum of 30), have a minimum congealing point of 120° F. and average molecular weights from about 350 to about 900. In the molten state, they are characterized by extremely low viscosities; that is, a Brookfield viscosity of 257° F. of a maximum of 100 cps. The typical alpha-olefin product comprises hydrocarbous in varying amounts which can be structurally represented by $RCH=CH_2$, $R_2C=CH_2$, $RCH=CHR$ and $R_2C=CHR$, where the total carbon atoms in each molecule can vary from 22 to 56. The alpha-olefin preferably comprises at least 50% normal alpha-olefin ($RCH=CH_2$). A preferred alpha-olefin has an average molecular weight of about 600, a congealing point of about 158° F., a Brookfield viscosity at 257° F. of about 4 cps and an iodine value of about 70. Such alpha-olefins are commercially available from Gulf Oil Chemicals as the $C_{30}+$ alpha-olefin fraction. Typically, the carbon number distribution of such alpha-olefins is about 22 weight percent of $C_{28}$ and lower and about 78 weight percent of $C_{30}$ and higher. Such alpha-olefins are described, for example, in U.S. Pat. No. 3,772,233 to Gaab et al. (1973), wherein blends of said alpha-olefins with certain waxes are suggested for crayon waxes, candle waxes and the like.

The oxidized polyethylenes utilized in the present invention are low molecular weight polyethylene homopolymers which have an average molecular weight of less than about 5,000. The average molecular weight is the number average molecular weight determined by vapor phase osmometry using phenetole as solvent. Preferably, the number average molecular weight is about 1,000 to 4,000 and most preferably about 1,500 to 2,500. These polyethylenes have preferably been oxidized to an acid number of about 10 to 35, more preferably about 12 to 28 and most preferably about 13 to 17. These oxidized polyethylenes preferably have a softening point as determined by ASTM E-28 of about 85° to 145° C., more preferably about 95° to 140° C. and most preferably about 98° to 115° C. Preferably, such oxidized polyethylenes have a Brookfield viscosity at 140° C. (284° F.) of about 120 to 300 centipoises, and most preferably about 170 to 250 centipoises. Such oxidized polyethylenes are commerically available, for example, from Allied Chemical as A-C$^R$ polyethylene types 629, 655, 690, 392 and the like.

The oxidized polyethylenes useful in this invention may be obtained by oxidizing low molecular weight polyethylenes with air or oxygen by conventional procedures. See, for example, U.S. Pat. Nos. 3,060,163 to Erchack (1962) and 3,322,711 to Bush et al. (1967).

The alpha-olefins and oxidized polyethylenes are blended so as to provide a blend of from about 1 to 40, perferably about 10 to 30, weight percent oxidized polyethylene and about 60 to 99, preferably about 70 to 90, weight percent of the alpha-olefin. The weight percents are based on the total weight of the blend. The blends may be obtained by any suitable blending technique. Preferably, the blends are prepared by mixing the components in the molten state and spray drying the mixture to obtain a powder. For example, the components may be melt blended at a temperature of about 10° C. higher than the melting point of the highest melting component, held at such temperature for about 5 to 30 minutes, cooled and then processed to provide a fine powder, flakes, prills or particles of the blend. Alternatively, the components may be dry blended. Preferably, the components are homogeneously blended.

The lubricant compositions of this invention are useful as external lubricants for vinyl polymers. Typically, such external lubricants are present in an about of about 0.01 to 5 parts (by weight) per 100 parts of the polymer. Preferred amounts of the lubricants are about 1 to 2 parts per 100 parts polymer. Such vinyl polymers include polyvinyl chloride, and polymerized forms of vinyl acetate, vinyl chloride-vinyl acetate copolymers, vinylidene halides such as vinylidene chloride vinyl pyridine, vinyl carbazole, styrene, vinylbenzene, acrylic esters such as methyl acrylate, ethyel acrylate or methylmethacrylate as well as acrylonitrile. The preferred vinyl polymer is polyvinly chloride. The term "polyvinyl chloride" is meant to include both homopolymers of vinyl chloride and co- and terpolymers of vinyl chloride with comonomers such as vinyl acetate, vinyl formate, alkyl vinyl ethers, ethylene, propylene, butylene, vinylidene chloride, alkyl acrylates and methacrylates, alkyl maleates, alkyl fumarates, etc. Preferably, at least 80% and more preferably 100% of the monomer to be polymerized will be a vinyl chloride monomer.

The vinyl compositions to which the lubricants are added are of the rigid type; that is, they contain essentially no plasticizer (such as dioctyl phthalate). Such vinyl resins are useful in the production of rigid articles, principally rigid pipe, siding, containers and sheets.

It is known that the effectiveness of lubricants on resins formulations can be evaluated by measurement of rheological properties of the formulation. These properties are typically studied by means of a torque rheometer consisting of a miniature mixer and a torque meter which measures the load on the mixer. The mixing forces developed within a sample of material at a certain temperature cause a deflection of a recording dynamometer. This deflection is recorded on a strip chart. This torque, which is expressed in meter-grams, is directly related to the viscosity of the melt being mixed. When a polymer of the vinyl type degrades, it crosslinks rapidly and shows a sharp rise in its melt viscosity. The time for this to occur is a measure of the thermal stability under dynamic shear conditions. A typical torque rheometer curve provides one skilled in the art with information as to melting, fusion, flow and crosslinking in the processing of the polymer tested. The most generally used rheometer is the Brabender Plasticorder which essentially consists of an oil-heated roller mixing head driven by a variable speed motor equipped with means to measure the torque developed in the head. The machine is fitted with a mixing head equipped with a melt thermocouple. To determine the fusion time of a polyvinyl chloride powder blend, for example, an accurately weighed quantity of the blend is charge into the mixing head with the aid of a quick-loading chute. A graph of the torque against time is produced and the point when fusion is complete is shown by an initial peak in torque. The dynamic heat stability is measured in minutes from the start of the graph until the decomposition point which is marked by a rise in torque.

It is generally desirable in the extrusion of polyvinyl chloride pipe compositions to obtain a long stability time and a long diffusion time at a relatively low fusion torque. That is, the less energy required to obtain good mixing in the extruder is desirable.

It has been found that the compositions of this invention provide excellent rheological properties in terms of fusion times and stability times at reduced fusion torques. Moreover, the compositions of this invention permit extrusion of polyvinyl chloride pipe and siding which have desired smooth and shiny surfaces.

The following non-limiting examples are given to further illustrate the invention. All parts are by weight unless otherwise stated.

EXAMPLE 1

Blends of an alpha-olefin commercially available from Gulf at the $C_{30}+$ fraction and an oxidized low molecular polyethylene commercially available from Allied Chemical as A-C$^R$ polyethylene type 629 were obtained by melt blending the components cooling and then grinding to a fine powder. The aplha-olefin had an average molecular weight of about 600, a congealing point of about 158° F., a Brookfield viscosity at 257° F. of about 4 cps and an iodine value of about 70. The polyethylene had an average molecular weight of about 1,500 to 2,500, and acid number of 15 mg KOH/g, a softening point of 104° C. and a Brookfield viscosity at 140° C. of 200 cps.

The physical properties of a blend of 80 weight percent of the alpha-olefin and 20 weight percent of the oxidized polyethylene were as follows: Ring and Ball softening point, °F. (°C.): 214 (101); viscosity, cps (Brookfield) at 284° F. (140° C.): 50; needle penetration, ASTM D-5, dmm: 4.5.

The effect of such blends as external lubricants for polyvinyl chloride pipe compounds was determined utilizing a Brabender Plasticorder at 190° C. jacket temperature with a 65 gram charge and 60 RPM. The following polyvinyl chloride pipe composition was employed:

| Ingredients | Parts |
| --- | --- |
| Geon 103EP76 | 100 |
| Organotin Stabilizer | 0.6 |
| Calcium Carbonate Filler | 2.0 |
| Titanium Dioxide Pigment | 1.5 |
| Processing Aid | 1.0 |
| Olefin Blend | 1.5 |
| Calcium Stearate | 0.4 |

The processing aid employed was Acryloid K120N, a copolymer of methylmethacrylate and ethylacrylate available from Rohm and Haas. The calcium stearate was employed as an additional external lubricant. A masterbatch of all the ingredients, except for the blend and calcium stearate, was prepared by blending in a Henschel mixer for 10 minutes at 3800 rpm and for an additional 10 minutes at 2600 rpm. the masterbatch was then mixed with the various blends and calcium stearate in a Waring blender for 2 minutes.

The fusion time, the torque fusion and the stability time were determined from the plastogram. The stability time is the total stability time, including the fusion time. The results are shown in Table 1, below.

TABLE 1

| Weight Ratio Alpha-Olefin/ Oxidized PE | Fusion Time (Min) | Fusion Torque (m-g) | Stability Time (min) |
|---|---|---|---|
| 90/10 | 4.175 | 2075 | 13.5 |
| 80/20 | 3.25 | 2300 | 12.25 |
| 70/30 | 2.625 | 2475 | 11.175 |
| 60/40 | 1.75 | 2800 | 10.25 |
| 50/50 | 1.5 | 3050 | 9.5 |
| 40/60 | 0.35 | 3675 | 8.0 |

It can be seen from Table 1 that the blends of the present invention provide excellent external lubricity for polyvinyl chloride pipe compounds. In particular, the fusion time and stability time of blends of at least about 60 weight percent of the alpha-olefin provide highly acceptable fusion and stability times and the torque at fusion is within an acceptable level. However, when the percent of alpha-olefin decreased to 50 and 40 percent, the fusion times and stability times were adversely effected as was the torque at fusion.

EXAMPLE 2

Example 1 was repeated except that the processing aid was not employed and the jacket temperature was 210° C. The formulation to which the lubricants in Table 2 were added was as follows: 100 parts by weight of polyvinyl chloride, 0.4 parts per 100 parts resin (phr) organotin stabilizer, 1.0 phr titanium dioxide and 1.0 phr calcium carbonate. Three weight ratios of the alpha-olefin-oxidized polyethylene blends were employed. These are indicated as Samples A, B and C in Table 2. For comparative purposes, there was employed instead of the alpha-olefin, a 165° F. paraffin wax; this is shown in Sample D in Table 2.

TABLE 2

| Sample | Components | Amount (phr) | Fusion Time (min) | Torque at Fusion m-g | Stability Time (min) |
|---|---|---|---|---|---|
| A | Alpha-olefin | 1.2 | 3.2 | 2100 | 8.0 |
|   | Oxidized polyethylene | 0.15 | | | |
|   | Calcium Stearate | 0.8 | | | |
| B | Alpha-olefin | 1.2 | 2.2 | 2100 | 8.0 |
|   | Oxidized polyethylene | 0.2 | | | |
|   | Calcium stearate | 0.8 | | | |
| C | Alpha-olefin | 1.2 | 2.5 | 2000 | 8.5 |
|   | Oxidized polyethylene | 0.3 | | | |
|   | Calcium stearate | 0.8 | | | |
| D | 165° F. Wax | 1.2 | 1.5 | 2500 | 6.5 |
|   | Oxidized Polyethylene | 0.15 | | | |
|   | Calcium Stearate | 0.8 | | | |

Table 2 likewise demonstrates the relatively long fusion and stability times resulting from the incorporation of the alpha-olefin and oxidized polyethylene as the external lubricant for the polyvinyl chloride, as well as a very low fusion torque. Moreover, by comparing Samples D (the 165° F. Wax) and A (the alpha-olefin), it can be seen that the fusion time was increased from 1.5 to 3.2 minutes and the stability time from 6.5 to 8.0 minutes and the fusion torques was reduced from 2500 to 2100 meter-grams. This is totally surprising since the alpha-olefin employed had a melting point of about 158° F., which is very similar to the 165° F. paraffin wax, and both materials are similar in structure and physical properties.

The rigid vinyl polymer compositions of this invention preferably include conventional additives such as additional lubricants, pigments, fillers, processing aids, impact modifiers and the like. Typical of the additional lubricants that may be employed herein are the stearates, such as calcium stearate. More exemplary, are the long-chain acids and alcohols such as stearic acid, montanic acid, stearyl alcohol, montanyl alcohol, esters of polyhydric alcohols and short-chain monocarboxylic acids, such as glyceryl monostearate, ethylene glycol dilaurate, and other metallic stearates. Such additives are utilized in their conventional amounts and may range, for example, up to about 5 parts per 100 parts resin or more.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A rigid polyvinylchloride polymer composition containing as an external lubricant a composition comprising a blend of:
   (a) from about 60 to 99 percent by weight of an alpha-olefin having
      (1) an average molecular weight of from about 350 to 900,
      (2) a minimum congealing point of 120° F. as determined by ASTM D-938,
      (3) a minimum iodine value of 30, and
      (4) a maximum Brookfield viscosity at 257° F. of 100 centipoises; and
   (b) from about 1 to 40 percent by weight of an oxidized low molecular weight polyethylene having an average molecular weight of less than about 5,000.

2. The composition of claim 1 comprising from about 70 to 90 percent by weight of said alpha-olefin and from about 10 to 30 percent by weight of said oxidized polyethylene.

3. The composition of claim 2 wherein said oxidized polyethylene has an acid number of about 10 to 35 and a softening point of about 85° to 145° C. as determined by ASTM E-28.

4. The composition of claim 3 wherein said oxidized polyethylene has an average molecular weight of about 1,000 to 4,000, an acid number of about 12 to 28 and a softening point of about 95° to 140°0 C.

5. The composition of claim 4 wherein said oxidized polyethylene has a Brookfield viscosity at 140° C. of about 120 to 300 centipoises.

6. The composition of claim 2 wherein said oxidized polyethylene had an average molecular weight of about 1,500 to 2,500, an acid number of about 13 to 17, a softening point of about 98° to 115° C. and a Brookfield viscosity at 140° C. of about 170 to 250 centipoises.

7. The composition of claim 6 wherein said external lubricant is present in said polyvinyl chloride in an amount of about 0.1 to 5 parts per 100 parts of polymer.

* * * * *

UNITED STATES PATENT AND TRADEMARK OFFICE
CERTIFICATE OF CORRECTION

PATENT NO. : 4,218,353
DATED : August 19, 1980
INVENTOR(S) : Yang K. Kim

It is certified that error appears in the above-identified patent and that said Letters Patent are hereby corrected as shown below:

Column 1, line 29, "properites" should be -- properties --.
Column 3, line 25, "about" should be -- amount --.
Column 3, line 31, insert --,vinyl fluoride, -- after chloride.
Column 3, line 44, insert -- polymer -- after vinyl.

Column 4, line 30, "at" should be -- as --.
Column 5, line 3, "the" should be -- The --.

Column 5, line 48, "m-g)" should be --(m-g) --.
Column 6, line 56, "140 OC" should be --140°C --.

Signed and Sealed this

Twelfth Day of May 1981

[SEAL]

Attest:

RENE D. TEGTMEYER

Attesting Officer    Acting Commissioner of Patents and Trademarks